United States Patent [19]
DeArkland

[11] Patent Number: 5,018,193
[45] Date of Patent: May 21, 1991

[54] COIN TELEPHONE BOX WITH ANTI-STUFFING COIN RETURN CHUTE

[76] Inventor: James R. DeArkland, 8119 Buena Fortuna, Carpinteria, Calif. 93013

[21] Appl. No.: 552,105

[22] Filed: Jul. 13, 1990

[51] Int. Cl.⁵ .................... H04M 17/00; B65G 11/04
[52] U.S. Cl. .................................. 379/145; 194/202; 232/57.5
[58] Field of Search ............ 379/150, 145, 451, 437, 379/440; 194/202, 203

[56] References Cited

U.S. PATENT DOCUMENTS 1,901,944  3/1933  Allen ............................... 379/145
4,946,095  8/1990  Anello et al. ..................... 379/145 X

*Primary Examiner*—Stafford D. Schreyer
*Attorney, Agent, or Firm*—Philip D. Junkins

[57] ABSTRACT

Apparatus is provided in a coin operated telephone box for inhibiting the stuffing of the coin return chute of the box with foreign materials. Coin operated telephone boxes are provided internally with a coin return chute, coin retrieval cavity below the coin discharge end of the coin return chute, and a coin return door in the front wall of the box. The return door is pivoted at its upper edge portion for swing movement inwardly toward the coin discharge end of the return chute and provides finger access to the coin retrieval cavity for the removal of coins from the box. To inhibit stuffing of the coin return chute there is provided a first gate plate, affixed to and carried by the return door proximate its lower edge portion, which partially spans the open top portion of the coin retrieval cavity. A second gate plate is pivotally attached to the coin return chute at its coin discharge end and such second gate plate extends downwardly to the upper surface of the first gate plate proximate the rearward edge portion thereof. The first and second gate plates cooperate to close off access to the coin return chute from the coin retrieval cavity when the coin return door is closed or pivoted inwardly. The second gate plate is pivotally movable away from the first gate plate by coins descending within the coin return chute to the first gate plate for sliding discharge along the first plate into the coin retrieval cavity.

10 Claims, 1 Drawing Sheet

COIN TELEPHONE BOX WITH ANTI-STUFFING COIN RETURN CHUTE

BACKGROUND OF THE INVENTION

Over recent years, coin telephone boxes have become prime targets for vandalism and theft including purposeful damage to make such boxes inoperable and jamming or stuffing of coin return chutes to inhibit coin return with the objective of periodic later illegal coin retrieval. Most public and private telephone companies that provide coin operated telephone boxes in public areas have found that such boxes are frequently damaged by vandals seeking to obtain coins therefrom. When frustrated in their efforts to obtain coins from pay telephone boxes, such persons often place fire crackers in the coin chute to jar coins into such chute or merely to damage the phone devices.

More creative vandals have devised means for stuffing the coin return chute of pay phone boxes with paper or plastic materials, behind the coin return door, whereby return coins are inhibited from dropping to the coin retrieval cavity behind the inwardly pivoted return door. Upon later removal of the stuffing material, coins that have been held back by the stuffing material drop into the coin retrieval cavity for removal by the vandal. Other telephone coin box thieves have devised means for running string or wire through the telephone box from the top coin slot to the bottom coin retrieval cavity so that they can attach a small plastic bag to the string or wire and pull same up through the coin return chute to catch returned coins. After an appropriate period of time the coin thief returns to the telephone box, removes the bag and coins and resets the bag trap within the telephone box.

It is an object of the present invention to provide mechanical gates within the coin retrieval cavity of coin operated telephone boxes, behind the coin return door, to inhibit the stuffing of the coin return chute leading to the coin retrieval cavity and to prevent the insertion of fire crackers and other explosive devices into the coin return chute.

It is another object of the invention to provide mechanical gating devices within the coin retrieval cavity of coin operated telephone boxes, behind the pivotal coin return door, to inhibit the illegal insertion of coin catch bags within the coin return chute above the coin retrieval cavity.

Another object of the invention is to provide pivoted gates, behind the coin return door in the coin retrieval cavity, which permit the passage of returned coins through the coin return chute and into the coin retrieval cavity yet inhibit the stuffing of the coin return chute.

Yet another object of the invention is to provide mechanical gates, within the coin retrieval cavity of coin operated telephone boxes, which cooperate to sever strings that may be inserted into such boxes in an attempt to illegally position coin catch bags within the coin return chute of such boxes.

Other objects and advantages of the invention will be apparent from the following detailed description (and accompanying drawing figures) of the gating apparatus that, in accordance with the invention, may be mounted within the coin retrieval cavities of coin operated telephone boxes to prevent the stuffing of coin return chutes and inhibit the illegal trapping of returned coins within such boxes.

SUMMARY OF THE INVENTION

The present invention relates to mechanical gating apparatus locatable within the coin retrieval or return cavity of coin operated telephone boxes, behind the coin return door, to inhibit the stuffing of the coin retrieval or return chute leading to the coin retrieval cavity and to prevent the placement of coin catch bags in the coin return chute for trapping returned coins with the intent of later illegal removal. In accordance with the invention there is provide, in association with the coin return door of telephone boxes, a first gate plate which is affixed to the lower end of the coin return door and extends downwardly and rearwardly into the coin retrieval cavity located below and behind such door.

A second gate plate is pivoted to the lower forward end of the floor of the coin return chute (located behind the coin return door) and extends downwardly and rearwardly into contact with the top surface of the first gate plate thereby sealing off access to the coin return chute. As the coin return door is pushed inwardly, to provide finger access to the coin retrieval cavity, the first gate plate moves with the door rearwardly and upwardly lifting with it the lower end of the second gate plate while maintaining (with the second gate plate) the sealed off relationship of the coin return chute with respect to the coin retrieval cavity.

The orientation of the first gate plate with respect to the orientation of the second gate plate (when the coin return door is in its closed position) is such that when coins are returned through the coin return chute of the coin telephone box they roll or slide by gravitational force down the inclined floor of the chute and drop onto the upper surface of the first gate plate. Since (with the coin return door closed) the first gate plate is inclined downwardly and rearwardly, the coins slide rearwardly down the upper surface of such plate pushing the lower end of the second gate plate upwardly so that sliding passage of the coins may be continued by gravitational force to the forwardly and downwardly inclined floor of the coin retrieval cavity, to the forward end thereof, for normal retrieval therefrom. Thus, through the invention, returned coins may continue to be passed by the structure of the coin return apparatus to the coin retrieval cavity below and to the rear of the coin return door while insertion of foreign objects and coin theft apparatus is prevented through the coin return door and its associated coin retrieval cavity and coin return chute.

BRIEF DESCRIPTION OF THE DRAWING FIGURES

In the accompanying drawing sheet:

DETAILED DESCRIPTION OF THE INVENTION

Figure 1:
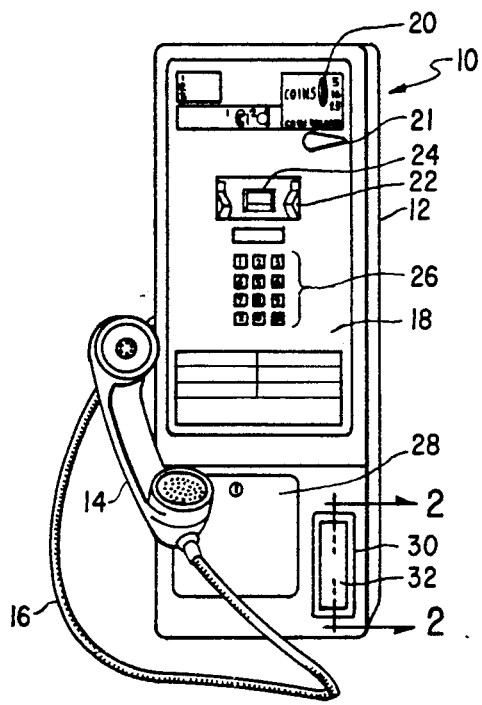
FIG. 1 is a front, partial perspective, view of a conventional coin telephone box with its telephone voice receiving and transmission instrument, coin deposit slot, dialing button panel, and coin return door.

Referring initially to FIG. 1 of the drawing sheet, there is illustrated a conventional coin operated telephone unit or station 10 including a box 12 containing standard coin receiving mechanisms, electronic dialing devices and circuitry, and coin return mechanisms, and a telephone voice receiving and transmitting handset 14 attached to the box 12 (and its internal circuitry—not shown) via a cable 16. The front face 18 of the box 12 includes at its upper right hand corner a coin slot 20 for the receipt of telephone call payment coins in amounts and number as directed by local call instruction set forth on the box or as directed by a telephone system operator handling a call, and a coin return lever 21. As illustrated, a telephone handset cradle 22 and circuit actuation device 24 is provided below the coin slot 20 and above the conventional panel 26 of dialing buttons. The lower portion of the box 12 contains a locked compartment 28 within which coins that are collected for charged local and long distance toll calls (made from the telephone unit 10) are stored, and a returned coin unit 30 including a top pivoted front coin return door 32.

Figure 2:
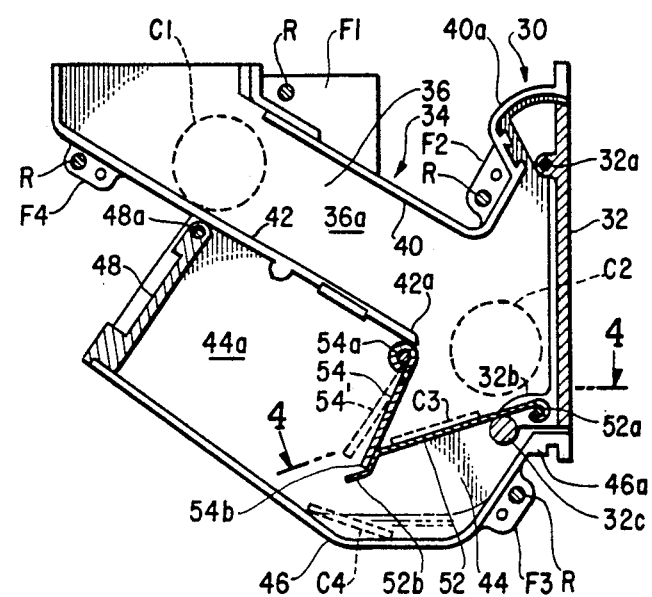
FIG. 2 is a side section view of a standard mechanical coin return unit for the telephone box of FIG. 1, taken along line 2—2 of FIG. 1, with the coin return door of the coin return unit in its closed orientation, and including the anti-stuffing, anti-coin-theft gate plates of the invention.

In FIG. 2 there is shown, in a side section view through line 2—2 of FIG. 1, one half structure 34 of the two part structure that makes up a conventional coin return unit 30 which is insertible and maintained within box 12. The one half structure 34 of the return coin unit 30 includes, as conventional components, a coin return chute 36 having an upper wall 40 (terminating in an upwardly oriented portion 40a) and inclined floor 42 (terminating in a forward edge portion 42a), a front coin return door 32, and a coin retrieval cavity 44 located below and behind door 32 and having a lower wall 46 (terminating in a forward edge portion 46a). The return coin unit 30 also may be provided with a rear pivoted door 48 closing off the back portion of the coin retrieval cavity 44.

Figure 3:
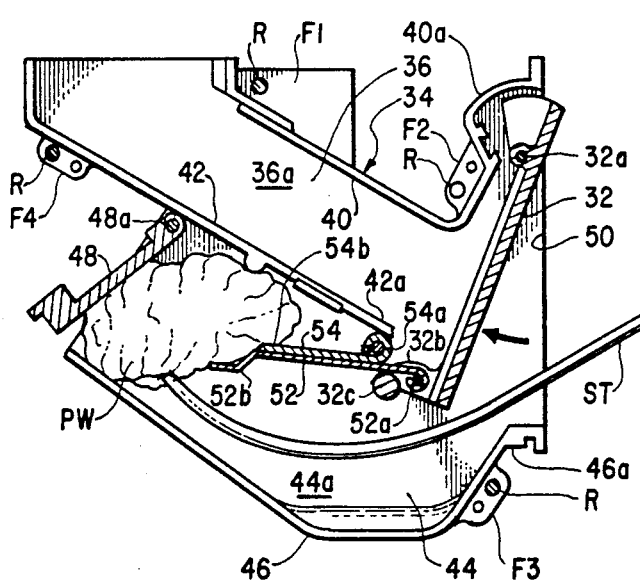
FIG. 3 is a side section view of the standard mechanical coin return unit of FIG. 2 with the coin return door of the unit in an open position showing an attempted stuffing of the coin return chute with blocking of the stuffing material by the anti-stuffing, anti-coin-theft gate plates of the invention.

The front coin return door 32 is pivoted in its upper portion, via pivot 32a, to the side wall 36a of the coin return chute 36 proximate the upwardly oriented portion 40a of upper wall 40 of the coin chute. Thus, the front opening 50 (see FIG. 3) of the return coin unit 30 and the coin retrieval cavity 44 are accessed by inward depression of the coin return door 32. The rear door 48, closing off the back portion of the coin retrieval cavity 44, is pivoted in its upper portion, via pivot 48a, to the side wall 44a of the coin retrieval cavity proximate to inclined floor 42 of the coin return chute 36. The anti-stuffing, anti-coin-theft gate plates 52 and 54 of the invention are shown in FIGS. 2 and 3. The first gate plate 52 is affixed to the lower end of the coin return door 32 via pivot shaft 52a (as shown in FIG. 2) or by rigid attachment means (not shown). Such plate normally extends downwardly and rearwardly into the coin retrieval cavity 44. Whether the gate plate 52 is pivotally or fixedly attached to the coin return door 32, it is maintained in slight obtuse angular orientation with respect to the door 32 so that when door 32 is closed the gate is positioned in its normal downwardly and rearwardly direction.

The second gate plate 54 is affixed to the lower forward end 42a of the floor 42 of the coin return chute 36 via pivot shaft 54a and extends (hangs) downwardly and rearwardly into contact with the top surface of gate plate 52 thereby sealing off access to the coin return chute 36, as shown in FIG. 2. To assist in the positive sealing off of the coin return chute 36, the gate plate 52 may be provided, proximate its free end, with an off-set portion 52b against which the end portion 54b of gate plate 54 may abut.

As the coin return door 32 is pushed inwardly, to provide finger access to the coin retrieval cavity 44, the first gate plate 52 moves with the door 32 rearwardly and upwardly lifting with it the lower or terminal end 54b of the second gate plate 54, as shown in FIG. 3. During this joint movement of gate plates 52 and 54 such gates maintain the sealed off relationship of the coin return chute 36 with respect to the coin retrieval cavity 44, as shown in FIG. 3. There is also shown in FIG. 3 an attempt at stuffing the coin return chute by the forcing of a wad of paper PW by a highly flexible stuffing tool ST. Because of the orientation and closure operation of the anti-stuffing gate plates 52 and 54, the stuffed wad of paper is inhibited from movement to the coin return chute 36 and the paper wad may be easily removed from the coin return unit 30 through the coin retrieval cavity 44 and front opening 50 of the coin return unit 30 or through the rear door 48 of such unit. It is to be further noted that the gate plates 52 and 54 cause the direction of any wad of material stuffed into the coin return cavity to be such that the wad of material does not inhibit or interfer with the operation of the coin return chute or operation of the telephone apparatus itself.

Access of returned coins to the coin retrieval cavity 44 is illustrated in FIG. 2. A returned coin C1 (as shown in dotted outline) first descends through the coin return chute 36. At the lower end of coin return chute 36 the coin, indicated in dotted outline as C2, drops toward the coin retrieval cavity 44 and is intercepted by gate plate 52. Thereafter the coin, indicated as C3, lands on the gate plate 52 and slides downwardly along plate 52 to its lower end and lifts the gate plate 54 dropping into the coin retrieval cavity 44, as indicated in dotted outline as C4.

Figure 4:
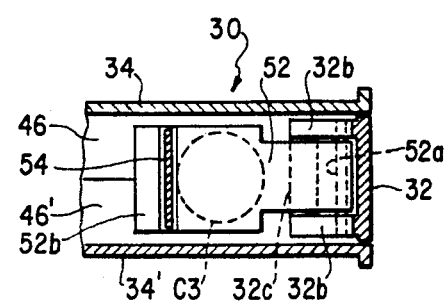
FIG. 4 is a cross-sectional view of the coin return unit and anti-stuffing, anti-coin-theft gate plates thereof taken along line 4—4 of FIG. 2.

In FIG. 4 there is presented a cross-sectional view of the coin return unit 30 and anti-stuffing, anti-coin-theft gate plates 52 and 54 thereof taken along line 4—4 of FIG. 2. The coin return unit 30 is comprised of mating one half structures 34 (the structure shown in FIGS. 2 and 3) and 34'. FIG. 4 also shows the lower walls 46 and 46' of the coin retrieval cavity 44 formed by the half structures 34 and 34'. Further, such figure shows the front coin return door 32 (in section) with door lugs 32b which inhibit forward movement of the door 32 and provide the pivot point connection of gate plate 52 to the door via pivot shaft 52a. Extending between the door lugs 32b is a rod 32c which, as shown in both FIG. 2 and in FIG. 3, acts as a stop against which pivoted gate plate 52 rests. It will also be noted that the lower end of gate plate 54 abuts the off-set portion 52b of gate plate 52. The half structures 34 and 34' which make up the coin return unit 30 are maintained in assembled condition via rivets R which extend through assembly flanges F1, F2, F3 and F4 of half structure 34 and mating assembly flanges F1', F2', F3' and F4' (not shown) of half structure 34'.

Figure 5:
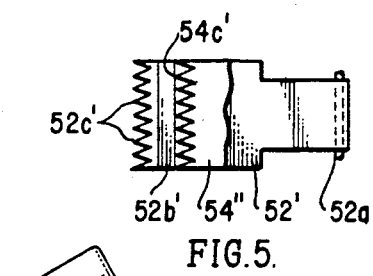
FIG. 5 is a top plan view of alternative forms of the anti-stuffing, anti-coin-theft gate plates of the invention.

To further inhibit placement of coin catch bags within the coin return chute via draw strings inserted through the front coin slot of the coin operated telephone box, the terminal edge of the end portion 54b of gate plate 54 may be sharpened for cutting any such string. In like fashion, the terminal edge of the off-set portion 52b of gate plate 52 may also be sharpened to sever strings illegally placed in the returned coin unit 30. As an alternative to the sharpening of the terminal edges of gate plates 52 and 54 such plates may include sharp serrated edges. Thus, there is shown in FIG. 5 a top plan view of a lower gate plate 52' pivoted at 52a and bearing in its end portion 52b' sharp serrations or saw tooth type projections 52c' and a partial cut-away view of upper gate plate 54" with sharp serrations or saw tooth projections 54c'. The serrations at the ends of plates 52' and 54" inhibit the stuffing of the coin return chute and provide alternative means for cutting any string type material which a coin box vandal or thief may attempt to manipulate through the coin return mechanisms of the box.

In the specification and drawing figures there has been set forth a preferred embodiment of the invention and although specific terms have been employed to describe the invention, they are used in a generic and descriptive sense only and not for purposes of limitation, the scope of the invention being defined in the following claims.

What is claimed is:

1. In a coin operated telephone unit having coin box, a coin return chute within said box, a coin retrieval cavity below the coin discharge end of said chute, and a coin return door in the front wall of said box pivoted at its upper edge portion for swing movement inwardly toward the coin discharge end of said chute and providing finger access to the coin retrieval cavity for the removal of coins therein, the improvement for inhibiting the stuffing of the coin return chute with foreign materials comprising:
   (a) a first gate plate affixed to and carried by the coin return door proximate its lower edge portion and partially spanning the open top portion of the coin retrieval cavity; and
   (b) a second gate plate pivotally attached to the coin return chute at its coin discharge end and extending downwardly to the upper surface of the first gate plate proximate the rearward edge portion thereof, said first and second gate plates cooperating to close off access to the coin return chute from the coin retrieval cavity when the return door is pivoted inwardly to provide access to said cavity, and said second gate plate being pivotally movable away from said first gate plate by coins descending within said coin return chute to said first gate plate for sliding discharge along said first gate plate into said coin retrieval cavity.

2. The improvement for inhibiting the stuffing of the coin return chute of a coin operated telephone as claimed in claim 1 wherein the free edge portion of the first gate plate has a sharpened edge whereby string material illegally inserted in said telephone and pulled between said first and second gate plates will be severed.

3. The improvement for inhibiting the stuffing of the coin return chute of a coin operated telephone as claimed in claim 1 wherein the free edge portion of the second gate plate has a sharpened edge whereby string material illegally inserted in said telephone and pulled between said first and second gate plates will be severed.

4. The improvement for inhibiting the stuffing of the coin return chute of a coin operated telephone as claimed in claim 1 wherein the free edge portion of the first gate plate is serrated whereby string material illegally inserted in said telephone and pulled between said first and second gate plates will be severed.

5. The improvement for inhibiting the stuffing of the coin return chute of a coin operated telephone as claimed in claim 1 wherein the free edge portion of the second gate plate is serrated whereby string material illegally inserted in said telephone and pulled between said first and second gate plates will be severed.

6. In a coin operated telephone box having a coin return chute including side, top and bottom walls and sloping downwardly and forwardly toward the front wall of said telephone box, a coin retrieval cavity below the coin discharge end of said chute and within said telephone box, and a coin return door in the front wall of said telephone box pivoted at its upper edge portion for swing movement inwardly toward the coin discharge end of said chute and providing finger access to the coin retrieval cavity for the removal of coins therein, the improvement for inhibiting the stuffing of the coin return chute with foreign materials comprising:
   (a) a first gate plate affixed to and carried by the coin return door, said first gate plate extending rearwardly and downwardly from the lower edge portion of said door and partially spanning the open top portion of the coin retrieval cavity; and
   (b) a second gate plate pivotally attached to the lower forward edge of the bottom wall of the coin return chute and extending downwardly and rearwardly to the upper surface of the first gate plate proximate its rearward edge portion, said first and second gate plates in their respective lower and rearward edge portions cooperating to close off access to the coin return chute when the coin return door of said telephone box is pivoted inwardly to provide finger access to said coin retrieval cavity, and said second gate plate being pivotally movable away from said first gate plate by coins descending within said coin return chute to said first gate plate for sliding discharge along said first gate plate into said coin retrieval cavity.

7. The improvement for inhibiting the stuffing of the coin return chute of a coin operated telephone box as claimed in claim 6 wherein the first gate plate has an off-set in the rearward edge portion thereof and the lower and rearward edge portion of the second gate plate abuts the off-set of said first gate plate when the coin return door, to which the first gate plate is affixed, is in its closed orientation.

8. The improvement for inhibiting the stuffing of the coin return chute of a coin operated telephone box as claimed in claim 6 wherein the rearward edge portion of the first gate plate has a sharpened edge whereby string material illegally inserted in said telephone box and pulled between said first and second gate plates will be severed.

9. The improvement for inhibiting the stuffing of the coin return chute of a coin operated telephone box as claimed in claim 6 wherein the lower and rearward edge portion of the second gate plate has a sharpened edge whereby string material illegally inserted in said telephone box and pulled between said first and second gate plates will be severed.

10. The improvement for inhibiting the stuffing of the coin return chute of a coin operated telephone box as claimed in claim 6 wherein the first gate plate is pivotally affixed to and carried by the coin return door.

* * * * *